Oct. 10, 1939.   F. L. DARLING   2,175,745
APPARATUS FOR APPLYING UNITING MATERIAL TO CAN CLOSURES
Filed Dec. 16, 1936   3 Sheets-Sheet 1
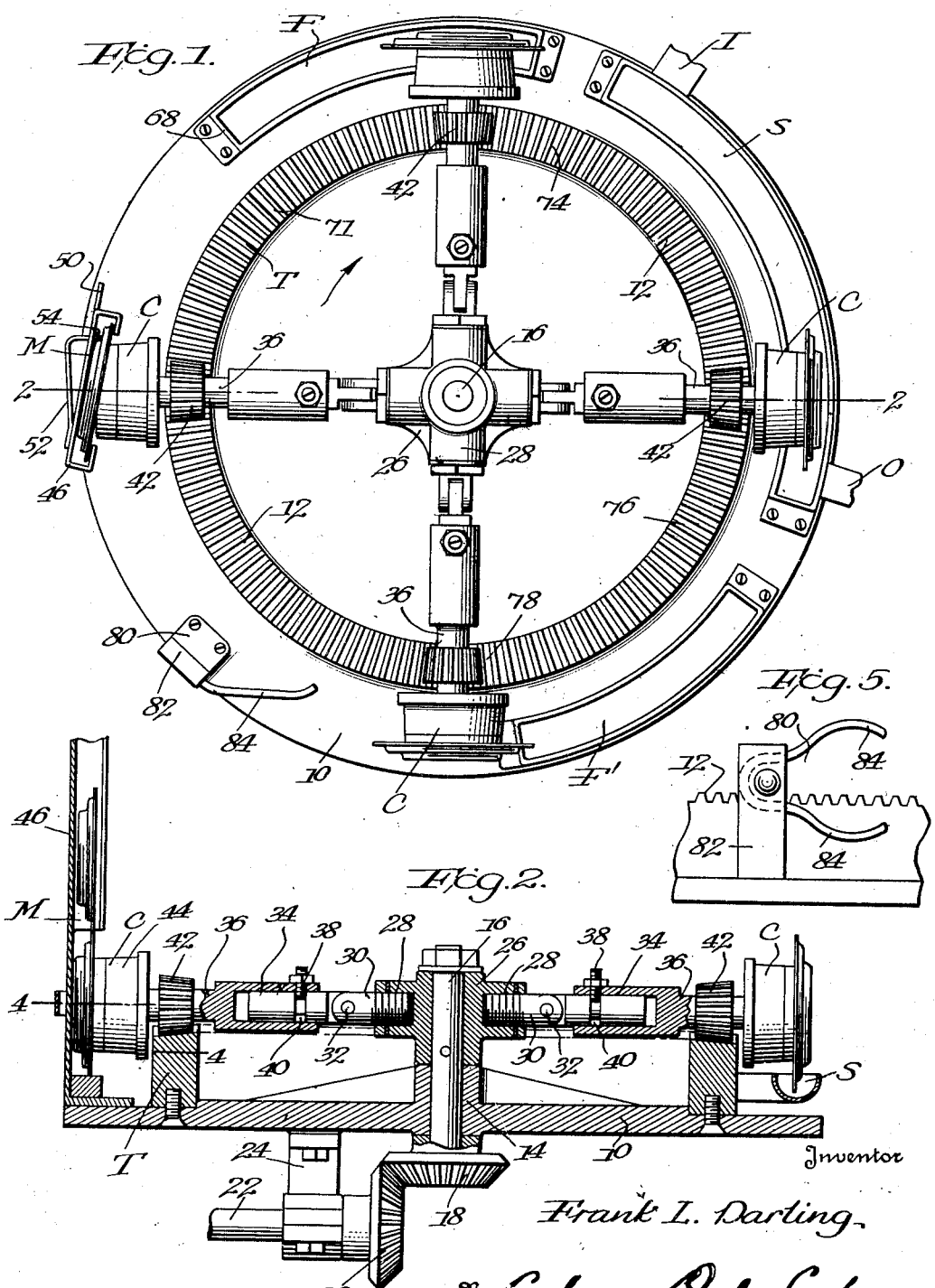

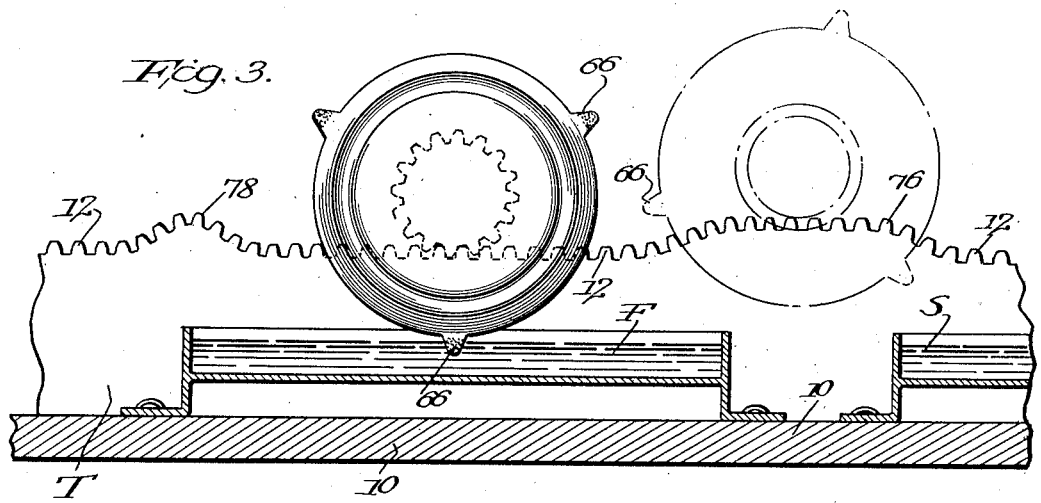
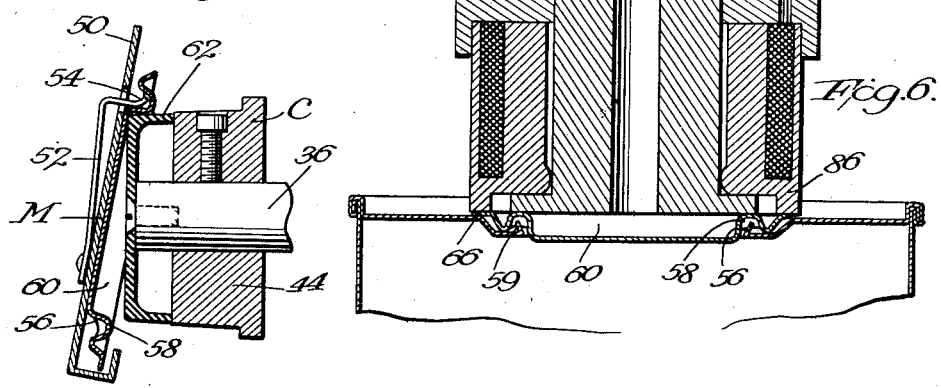
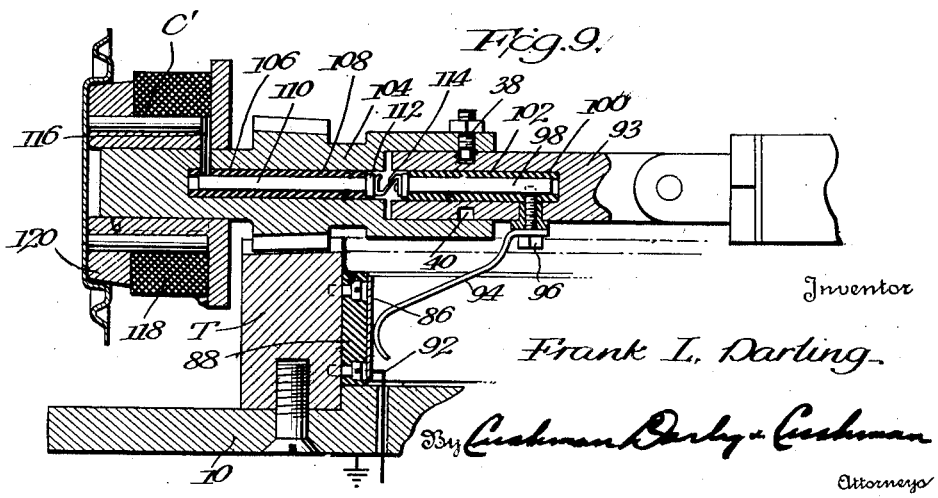

Oct. 10, 1939.　　　　F. L. DARLING　　　　2,175,745
APPARATUS FOR APPLYING UNITING MATERIAL TO CAN CLOSURES
Filed Dec. 16, 1936　　　3 Sheets-Sheet 3

Inventor
Frank L. Darling.
By Cushman Darby & Cushman
Attorneys

Patented Oct. 10, 1939

2,175,745

UNITED STATES PATENT OFFICE 2,175,745

APPARATUS FOR APPLYING UNITING MATERIAL TO CAN CLOSURES

Frank L. Darling, Teaneck, N. J., assignor, by mesne assignments, to Crown Can Company, Philadelphia, Pa., a corporation of Pennsylvania Application December 16, 1936, Serial No. 116,210

6 Claims. (Cl. 113—80)

The present invention relates to a machine for applying a uniting material such as solder to the periphery of can tops of the type disclosed in my prior Patents Nos. 2,024,511, December 17, 1935, and 2,024,512, December 17, 1935.

The type of top disclosed in the above mentioned patents has a substantially flat body provided with an annular wall centrally thereof which is adapted to seal within an opening in the head of a container, such as a can. The top has a substantially continuous edge and spaced triangular pointed tips extending from said edge which are adapted to be soldered to the head of the container when the top is applied thereto.

The principal object of the invention is to provide a machine which will apply solder and flux to the tips of the above-mentioned top, so that said tips may be soldered to the container head by a simple operation consisting only in the application of heat to the tips to fuse the same to the head.

Ancillary to this main objective, it is an object of the invention to provide a continuously operating machine including a carrier moving in an orbital path, which will automatically remove the tops from a magazine and convey them through the path, the application of the solder and flux being automatically performed during this movement.

Another object of the invention is to provide a machine which will automatically dip the tips into flux and solder without applying solder to the continuous edge of the top or fouling the sealing material in the top with flux or solder.

Another object of the invention is to provide a magazine for the tops including a holder for supporting a top in position intersecting the path of movement of said carrier, so that the carrier will remove the top from the magazine, the latter automatically feeding another cap to position for removal by the carrier.

A further object of the invention is to provide a carrier including a contractile mandrel which will enter the dished portion of the top as it is presented by the magazine to grip the same centrally thereof so that the periphery of the top will be free to be presented to the flux and solder baths.

Another object of the invention is to provide a carrier including electromagnetic means for gripping the top centrally thereof with its periphery free for presentation to the solder bath.

Various other objects and advantages of the machine disclosed herein will be apparent as the specification progresses.

In the drawings:

Figure 1 is a top plan view of the machine of the present invention.

Figure 2 is a vertical sectional view of the machine taken on the line 2—2 of Figure 1.

Figure 3 is a side elevational view of a portion of the machine disclosed in Figure 1.

Figure 4 is a horizontal sectional view of a portion of the machine taken along the line 4—4 of Figure 2.

Figure 5 is a detailed view of the device for removing the tops from the carrier.

Figure 6 is a vertical sectional view through a heating head showing the manner in which the caps, after being treated in the machine of the present invention, are fixed to their containers.

Figure 9 is an enlarged vertical sectional view through the carrier of the modification disclosed in Figure 7, showing the electrical connections for energizing the carrier electro-magnet.

Figures 7, 8:
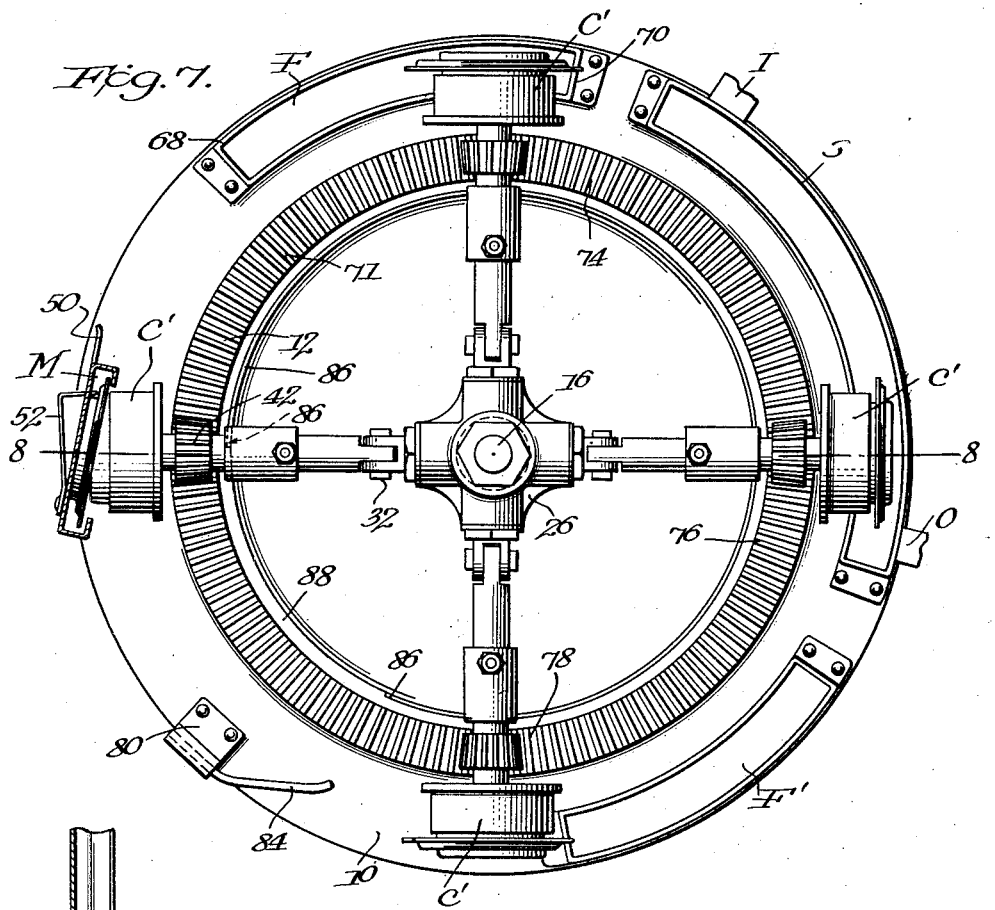
Figure 7 is a top plan view of a modified form of the invention.
Figure 8 is a vertical sectional view on the line 8—8 of Figure 7.

The machine of the present invention is most particularly adapted for applying solder to the periphery of can tops. However, it is susceptible of use in applying other uniting material thereto. Furthermore, the machine may be adapted to apply solder to a continuous edge of a can top, although its operation is of outstanding effectiveness in applying solder to tips which extend from the edge of the top. The latter use, as disclosed, results in a pronounced saving of solder, as just enough solder is applied to the tips so that the top may be easily removed from the opening in the container head by inserting an instrument beneath the top.

The apparatus comprises in the main a magazine M which carries a stack of tops of the type described, carriers C for conveying the tops from the magazine in the direction of the arrow of Fig. 1 successively through the first flux bath F, the solder bath S and the second flux bath F', and an orbital trackway T for guiding the carriers as they convey the tops through the orbit.

The trackway is mounted upon a base 10 and comprises a circular bar, although other forms of the bar may be used, depending on the path of movement of the carrier which is most convenient. The upper surface of the bar is formed with teeth 12 constituting a beveled circular rack. Disposed in the base and centrally of the trackway is a fixed bearing 14 in which is mounted a vertical shaft 16, said shaft extending below the base 10 and being provided on its lower end with a bevelled gear 18, which gear is driven by another bevelled gear 20 carried by a shaft 22, said shaft being driven from any suitable source of power. The shaft 22 is journaled within a bracket 24 attached to the lower surface of the base 10.

Fixed to the upper end of the shaft 16 is a horizontal movable support comprising a cross 26, said cross being provided with four outwardly extending sockets 28 into which are threaded bolts 30 which revolve the carriers, as will later appear. Only one carrier may be used, but I have disclosed the machine as mounting four of them.

As all of the carriers are identical, a description of one of them will suffice. Each bolt 30 is in two sections, horizontally pivoted together at 32. The outer section fits within a socket 34 in the inner end of a rotatable shaft 36, the shaft being rotatable around the bolt, but incapable of longitudinal movement with respect thereto by reason of the engagement of the pin 38 passing through the socket wall within the annular groove 40 in the outer section of the bolt 30.

The shaft 36 has fixed thereto a beveled circular gear 42, which gear is adapted to rest upon and mesh with the teeth 12 of the circular trackway T to rotate the carrier throughout its path of movement. Connected with the shaft 36 and outwardly of the gear 42 is a carrier member C which comprises a circular head 44 provided with means to grip the tops centrally thereof in a manner hereinafter described.

The magazine M includes a vertical channel 46 bolted to the base 10, said channel supporting therein a stack of tops as shown in Figures 2, each top having its body in a vertical plane and being located one above another in the magazine. As shown in Figures 1 and 4, the magazine is not disposed tangentially of the path of the carrier C, but is disposed at an angle to the path, and the lowermost top intersects the path of movement of the carrier. At the lower end of the magazine, the forward wall of the channel is bent outwardly as at 50 so that a carrier moving through the magazine is permitted to remove a cap therefrom. Fixed to the lower end of the magazine channel on the rear face thereof is a spring member 52, the inner end 54 of which extends through an opening in the rear wall of the channel and engages the rear face of the lowermost top to press the same against the end of the carrier.

The tops operated upon by the apparatus of the present invention are best disclosed in Figure 6. They are substantially flat discs having bent therefrom an annular wall 56 which is adapted to fit into the opening in the can head. The tops are sealed to their heads by the engagement of the sealing material in the annular groove 58 surrounding the wall 56 with an outwardly disposed flange 59 surrounding the opening in the head of the can, in the manner disclosed in my above mentioned Patents Nos. 2,024,511 and 2,024,512. The formation of the annular wall in the top results in a dished portion 60 in the opposite face of the top, and this dished portion is presented to the carrier as shown in Figure 4. When the magazine is filled with tops, the lowermost top is held intersecting the path of movement of the carriers so that the leading edge of the carrier enters the dished portion 60 of the cap. As the carrier continues movement past the magazine, the spring 52 is retracted to permit the top to be removed from the magazine, and the inner end 54 of the spring engages the outer wall of the dished portion of the top, moving along the same as the carrier moves past the magazine, thus forcing the trailing end of the top on to the carrier.

In the preferred form of the invention, the shaft 36 of the carrier extends through the body 44 thereof and on the end of said shaft is mounted a hollow rubber mandrel 62. The mandrel is of an exterior diameter slightly greater than the interior diameter of the dished portion of the tops, and is contractile by reason of its construction and the material from which it is made. The mandrel is of a shape conforming with the interior of the dished portion of the tops.

When the mandrel 62 enters the dished portion 60 of the lowermost top, and moves past the magazine, the spring 54 forces the top on to the mandrel, slightly compressing the latter, so that the mandrel will grip the top and convey the same from the magazine. The mandrel grips the top centrally thereof, so that the peripheral edge of the top including the tips 66 is free of the carrier and mandrel, resulting in advantages which will be hereinafter apparent.

The first flux bath F is located in the path of movement of the carrier, said bath comprising a container open at its top and filled with flux to the proper level. The container has an entrance end 68 and an exit end 70 disposed in the path of movement of the top. The rack 12 is provided with a raised portion 71 located in radial alignment with the entrance end of the flux bath, this raised portion being of an altitude sufficient to lift the top over the entrance end 68 of the bath. The arm 36 of the carrier is permitted to rise when the gear 42 engages the raised portion 71 of the rack by reason of the horizontal pivotal connection 32 of the sections of the bolt 30.

Disposed further on in the orbital path of the carrier and extending between the exit end of the flux bath and the entrance end of the solder bath S is a second raised portion 74 of the rack 12. When the top is approaching the end of the flux bath F, the gear 42 ascends the raised portion 74, thus lifting the peripheral edge of the top over the exit end of the flux bath, retaining it in raised position until it passes over the entrance end of the solder bath, at which time the gear 42 has descended upon the level portion 12 of the rack, and the tips of the top will be immersed in the solder. The solder will be kept at proper level in the bath to only immerse the tips, without applying solder to the continuous edge of the top. The construction and arrangement of the carrier with its supporting track and gear is such that the top is rotated over the solder bath to immerse only the tips in the solder, when the solder is at the proper level in the bath.

The solder bath comprises a container open at its upper end, substantially similar in construction to the first flux bath F described above, except that it occupies a greater portion of the orbital path of the carrier than the flux bath. The solder bath may be provided with any conventional heating arrangement and the heat applied may be controlled to vary the thickness of the solder applied to the tips. The solder bath may include an inlet I and an outlet O which permit continuous flow of molten solder therethrough at a proper level. If desired, the flux baths may likewise be equipped to maintain a constant level of flux therein.

After the top has been moved through the solder bath, the gear 42 encounters a third raised portion 76 in the rack 12, serving to elevate the top over the exit end of the solder container and the entrance end of the second flux bath F1 so that the tips are immersed in flux after the solder is applied. The flux bath F1 is substantially similar to the first flux bath F, and adjacent the exit end of said bath another raised portion 78 is provided in the rack 12, to lift the top over the exit end of said bath.

Further movement of the carrier in its orbital path brings the top into contact with a top removing device 80 located in the path of movement of the carrier. This removing device may be of any desired construction, but is shown in the form of a bracket 82 to which is secured a removing member including two arms or hooks 84 (Fig. 5) which are bent inwardly into the path of the carrier. The distance between the hooks 84 is such that the end of the carrier and mandrel will pass through the same, but the hooks engage the inner wall of the top adjacent the periphery thereof and remove the same from the mandrel, the tops dropping at this point into any appropriate receptacle or on to a conveyor which carries the top to any point of disposal.

It will be apparent that the machine provides for immersing the tips into flux so that the solder will adhere thereto, then into solder and again into flux so that the applied solder will adhere to the end wall of the container when the tops are put in place as shown in Figure 6 and a heating device 85 is applied to the tips. The heating device is preferably made of aluminum or other material to which solder will not adhere. The machine provides an even coating of solder on the tips, and insures that the solder will cover only the tips and will not foul the substantially continuous edge of the tops when the solder is at the correct level in the bath. Furthermore, the machine insures that none of the flux and solder will pass into the groove 58 in the top and foul the sealing material therein.

It will be observed that the peripheral edge of the top is untouched by any instrumentality during the entire cycle of operations, by reason of the fact that the carrier supports the top centrally thereof with its peripheral edge free. Thus, there is no danger of distorting the edge of the top, or scraping away any of the solder applied before the same has had a chance to cool.

The operation of the invention will be clear from the above description, and it will be appreciated that the operation is continuous, in that tops may be continuously fed to the machine from the magazine M, and the carriers C rotate past the lower end of said magazine, removing the tops therefrom. As each top is removed, another one is fed to position intersecting the path of movement of the carriers. The carriers operating in succession carry tops through the first flux bath F, the solder bath S and the second flux bath F-1, said tops being successively discharged from the machine by the removing device 80. The tops disclosed are provided with relatively widely spaced tips, but all of said tips will be brought into the flux and solder by reason of the rotation of the carrier during its passage over the baths caused by the engagement of gear 42 with rack 12. Furthermore, this rotation makes unnecessary the angular alignment of the top on the carrier, as, no matter in what position a tip is when the top is forced on the carrier, it will be rotated through the bath. The tops are at this stage in condition to be secured to the end wall of a container by the application of heat only and without the necessity of applying additional flux. The tops may be applied to their containers at the proper point of operation of a filling and closing machine, and the step of securing the tops to the container heads will not complicate said machine, as application of heat only is necessary to secure the tops by fusing the solder on the tips.

In Figures 7, 8 and 9, a modified form of the invention is disclosed in which electro-magnetic means is substituted for the contractile means described above for gripping the top centrally thereof and retaining the same on the carrier during the time the latter traverses the flux and solder baths. Referring to Figure 7, the inner wall of the track T carries a strip of conducting material 86 such as copper, through the portion of the orbital path of the carriers in which a top is carried thereby. This conducting strip is secured to another strip of insulating material 88 which is secured to the inner wall of the track 12, the latter strip insulating the conductor strip from the metal track. The conducting strip extends from the station where the magazine M is located through the orbital path of movement of the carriers to the station where the top removing device 80 is located, where the conducting strip ends, and the insulating strip at this point is of increased thickness to conform with the inner wall of the conducting strip throughout the portion of the path of movement of the carriers 90 extending from the removing station to the magazine station.

The conducting strip 86 is connected with any desired source of current by the wire 92 as shown in Figure 9, and the bolt 93 of each carrier is equipped with a downwardly extending spring conducting finger 94 which engages the inner wall of the conducting strip. The upper end of the finger 94 connects with a bolt 96 which passes into the interior of the carrier bolt 93, being suitably insulated therefrom, said bolt connecting with a conducting wire 98 disposed within a longitudinal bore 100 in the arm, said wire being insulated by a sleeve of insulating material 102 which insolates the wire from the interior of the bore. The rotating shaft 104 of the carrier is also provided with longitudinal bore 106 which is lined with an insulating sleeve 108, and within said sleeve is a conducting wire 110 secured to a conducting head 112 at the inner end of the sleeve 108. A spring conducting member 114 makes connection between the wire 110 and the wire 98, this connection permitting the circuit to be maintained during rotation of the carrier shaft 104 around the bolt 93. The outer end of the wire 110 is connected with a wire 116 extending through the carrier head, said wire being suitably insulated therefrom, and being connected with the wiring 118 of an electro-magnet, which magentically energizes the mandrel 120 of the carrier, said wiring being suitably grounded through the machine frame. The carrier of this modification of the invention is of such construction that the mandrel will not become permanently magnetized.

The mandrel is of such shape that it will enter the dished portion of the top in the same manner discussed in connection with the mandrel 62 of the preferred embodiment of the invention.

In the operation of this form of the invention, as a carrier arrives at the magazine M, its spring connector 94 engages the beginning of the conducting strip 86, passing current through the wiring 118 to energize the mandrel 120 as it enters the dished portion of the cap which will be forced over the mandrel by the spring 52 in the manner hereinbefore described. Further movement of the carrier in its bath carries the top from the magazine, and said top will be retained on the mandrel by the magnetic action of the same. The carrier rotates the top throughout its path of movement, and carries the top through the flux and solder to the tips. The tips are elevated over the ends of the containers for flux and solder as previously described, by the elevation of the carriers resulting from the engagement of the gear 42 with the successive raised portions 71, 74, 76 and 78 of the track 12. Referring to Figure 9, it will be noted that the width of the conducting strip 86 is sufficient to permit the end of the spring conductor 94 to remain in contact therewith during elevations of the carrier resulting from the engagement of the gear 42 with the various raised portions of the track 12. When the carrier reaches the removing device 80, the spring conductor 94 passes off of the copper ring 86 and on to the portion of the insulating ring 90, at which time the electromagnet is deenergized, permitting the removing arms 84 to strip the top from the mandrel.

Various changes in the apparatus disclosed herein may be made without departing from the invention.

I claim:

1. In an apparatus of the character described, a bath comprising a tank open at its upper end and having uniting material in liquid condition therein, a carrier for moving a container top of the type having a dished portion in one face thereof to and across the open end of said bath and for moving said top from said bath, a container top holder adapted to support the top with the body thereof in a vertical plane intersecting the path of movement of said carrier and with the dished face of said top presented to said carrier, said carrier having a contractile mandrel adapted to be forced into the dished portion of said top as said carrier passes said holder, means for lowering said carrier when over said bath to dip the free peripheral edge of the top into the uniting material with the body of the top in a vertical plane and with its periphery free of said mandrel, and means for removing the top from said carrier after the latter has moved the top from said bath.

2. In an apparatus of the character described, a bath comprising a tank open at its upper end and having uniting material in liquid condition therein, a carrier for moving a container top to and across the open end of said bath and for moving said top from said bath, the top having a substantially continuous edge and a plurality of tips extending beyond the edge, a container top holder intersecting the path of movement of said carrier, means on said carrier for gripping the top centrally thereof as said carrier passes said holder, means for lowering said carrier when over said bath to dip the tips of the top into the uniting material with the body of the top in a vertical plane and with the tips free of said carrier and gripping means, means for rotating said top when in position over said bath to move the tips through the uniting material without dipping the continuous edge of the top therein, and means for removing the top from said carrier after the latter has moved the top from said bath.

3. In an apparatus of the character described, a bath comprising a tank open at its upper end and having uniting material in liquid condition therein, a carrier for moving a container top to and across the open end of said bath and for moving said top from said bath, a container top holder intersecting the path of movement of said carrier, electro-magnetic means included in said carrier for gripping the top centrally thereof as said carrier passes said holder, means for lowering said carrier when over said bath to dip the free peripheral edge of the top into the uniting material with the body of the top in a vertical plane and with its periphery free of said carrier and gripping means, and means for removing the top from said carrier after the latter has moved the top from said bath.

4. In an apparatus of the character described, a bath comprising a tank open at its upper end and having uniting material in liquid condition therein, a carrier for moving a container top of the type having a dished portion in one face thereof to and across the open end of said bath and for moving said top from said bath, a container top holder adapted to support the top with the body thereof in a vertical plane intersecting the path of movement of said carrier and with the dished face of said top presented to said carrier, said carrier having a contractile mandrel of resilient material of substantially the same exterior form but larger than the interior of the dished portion of said top, said mandrel being adapted to grip and retain the top by its own resiliency when forced into the dished portion thereof as said carrier passes said holder, means on said holder for forcing the top onto said mandrel, means for lowering said carrier when over said bath to dip the free peripheral edge of the top into the uniting material with the body of the top in a vertical plane and with its periphery free of said mandrel, and means for removing the top from said carrier after the latter has moved the top from said bath.

5. In an apparatus of the character described, a carrier for container tops of the type having a dished portion in one face thereof, means for moving said carrier in a horizontal orbital path, a holder for a container top adapted to support the top with the body thereof in a vertical plane intersecting the path of movement of said carrier and with the dished face of said top presented to said carrier, yieldable means on said holder for forcing the top against said carrier, and a contractile mandrel on said carrier having a continuous periphery of substantially the same exterior form but larger than the interior of the dished portion of the top, said mandrel being made of a resilient compressible substance and being adapted to grip and retain the top by its own inherent resiliency upon being forced into the dished portion thereof when said carrier passes said holder to grip and convey the top from said holder.

6. In an apparatus of the character described, a support, a carrier for container tops of the type having a central dished portion in one face thereof, said carrier being mounted for horizontal movement through an orbital path on said support and for vertical movement with respect thereto, a stationary container top holder intersecting the path of movement of said carrier, said holder being adapted to support a top with the dished face thereof presented to said carrier, means on said carrier for gripping the container top as said carrier passes said holder and for retaining the top on said carrier as the latter moves from said holder, said means comprising a contractile mandrel having a continuous periphery of substantially the same exterior form but larger than the interior of the dished portion of the top, said mandrel being made of a resilient compressible substance and being adapted to grip the top centrally thereof and retain the same by its own inherent resiliency with the peripheral edge of the top free of the mandrel when the mandrel is forced into the dished portion thereof, a stationary solder bath in said orbital path, means for moving said carrier vertically to dip the free peripheral edge of the top into said bath, and means in said orbital path for removing the top from the carrier after said carrier has traversed said bath.

FRANK L. DARLING.